United States Patent

Spahl et al.

[11] Patent Number: 6,069,942
[45] Date of Patent: May 30, 2000

[54] METHOD FOR THE LEGITIMACY CHECK OF CALL NUMBERS OF CALLS INCOMING AT A COMMUNICATION SYSTEM

[75] Inventors: Siegfried Spahl, Puchheim, Germany; Friedrich Ramberger, Hennersdorf; Adolf Mayer, Pellendorf, both of Austria

[73] Assignee: Siemens Aktiengesellschaft, Munich, Germany

[21] Appl. No.: 08/866,095

[22] Filed: May 30, 1997

[30] Foreign Application Priority Data

May 31, 1996 [DE] Germany ............................ 196 22 068

[51] Int. Cl.[7] ........................ H04M 3/436; H04M 3/527; H04M 7/00
[52] U.S. Cl. ........................ 379/196; 379/198; 379/213; 379/233
[58] Field of Search ..................................... 379/188, 196, 379/197, 198, 210, 211, 213, 233

[56] References Cited

U.S. PATENT DOCUMENTS

| | | | |
|---|---|---|---|
| 5,259,026 | 11/1993 | Johnson | 379/213 X |
| 5,521,969 | 5/1996 | Paulus et al. | 379/142 |
| 5,535,269 | 7/1996 | Hamada | 379/213 X |

FOREIGN PATENT DOCUMENTS

| | | | |
|---|---|---|---|
| 28 30 282 | 1/1980 | Germany | H04M 3/38 |
| 32 05 780 A1 | 8/1983 | Germany | H04M 3/38 |
| 34 33 660 A1 | 3/1986 | Germany | H04M 3/42 |
| 36 33 186 A1 | 7/1988 | Germany | H04M 3/38 |

*Primary Examiner*—Harry S. Hong
*Attorney, Agent, or Firm*—Hill & Simpson

[57] ABSTRACT

In a communication system (KS), communication terminals (KA) provided for a legitimacy check are allocated to at least one inhibit dial evaluation routine (SWABE). In the framework of a call (ar), the call numbers (zrn) communicated to the inhibit dial evaluation routine (SWABE) as well as the call number (rnr) of the respective communication terminal (KA) are acquired and call numbers (zrn) or, respectively, call number combinations (rnr,zrn) that cannot be evaluated are reported to an application means (PC) via an application interface (acl). The calls (ar) are held in the communication system (KS) until the communicated call numbers (zrn) or, respectively, call number combinations (rnr, zrn) have been checked in the application device (PC) in view of their legitimacy and a legitimacy result (acl-amo) has been communicated from the application device (PC) to the communication system (KS). An advantage of the inventive method may be seen therein at only one inhibit dial evaluation routine (SWABE) need be established in the communication system (KS) for the communication terminals (KA) to be checked. Thus, the legitimacy checking of call numbers (rnr, zrn) of incoming calls (ar) is realized with the lowest possible additional outlay in the communication system (KS).

16 Claims, 2 Drawing Sheets

| skz(pa) | vtz(y) | poi(E) | mr,zm(4490, 120045677985) | wg(05) |

FIG. 2A       wam

| skz(go) | vtz(80) | ref(55) | zm'(12004877667) | wg(01) |

FIG. 2B       acl-amo aa,aq
| skz(co,ca) | ac(10,90) | ref(55) | lm(56) | wg(05) | zi | kzi |

METHOD FOR THE LEGITIMACY CHECK OF CALL NUMBERS OF CALLS INCOMING AT A COMMUNICATION SYSTEM

BACKGROUND OF THE INVENTION

For a control of performance features in a communication network, particularly a private communication network, a coupling of the communication system, particularly private branch exchanges, to an application means via an application interface or, respectively, ACL interface is provided. According to this application interface, the private communication system, for example, the communication system HICOM 300 of Siemens AG, is physically connected to the application means via a V.24 interface or, alternatively, via an ISDN basic interface (SO). The application interface is preferably realized in administration and maintenance unit (an integrated administration and maintenance server in the communication system HICOM 300) of a communication system and controls the communication exchange according to a defined protocol, for example, MSV1, with defined messages. The information embedded into the messages correspond to the switching-oriented instructions and event messages of the communication system. The program structure or, respectively, a switching routine that is suitable therein for execution of the switching-oriented instructions and for generating the switching-oriented event messages, i.e. a program structure or, respectively, a switching routine that supports a DVA-controlled call setup is provided as link element between the application means and the communication system, whereby the connection control is influenced by the switching-oriented instructions and the current switching-oriented status of connections is indicated by the switching-oriented event messages, i.e. those as well that are in the course of call setup.

Specific connections, for example, data communication can be undesired in communication systems and should not be switched. Further, call setups with, for example, invalid destination call numbers or, respectively, destination call numbers that are no longer allowed are to be supported such by the communication system that a call setup to the alternatively allowed communication terminal equipment is enabled.

SUMMARY OF THE INVENTION

It is an object of the present invention to provide a method for flexible legitimacy checking of call numbers of calls incoming at the communication system taking a low-circuit-oriented and program-oriented modification of the communication system into consideration.

An important aspect of the inventive method is that communication terminals provided in the communication system for a legitimacy check are allocated to at least one inhibit dial evaluation routine and the call numbers communicated from the provided communication terminals within the framework of a call as well as the call number of the respective communication terminal are acquired and call numbers as well as call number communications that cannot be evaluated are reported to the application means via the application interface. The calls are held in the communication system until the communicated call numbers or, respectively, call number combinations that cannot be evaluated and that have been communicated have been checked with respect to their legitimacy in the appellation means and a legitimacy result has been communicated from the application means to the communication system. Call numbers or, respectively, call number combinations that cannot be evaluated are, for example, call numbers that contain a prefix (for example, ISDN communication network identifier) that cannot be interpreted in the inhibit dial evaluation routine because of its predetermined, limited interpretation properties. An important advantage of the inventive method is that only one inhibit dial evaluation routine need be established in the communication system for the communication terminals to be checked and, thus, the legitimacy check of call numbers of incoming calls is realized with the lowest possible additional outlay in the communication system. Further, the greater possible flexibility in view of the check functions and potential conversion functions is achieved, since the application means is advantageously realized by a personal computer and, thus, the check and conversion functions can be modified at any time by inputs at the user service or by loading programs without influencing the communication system.

After the legitimacy check, the respective call is permitted, aborted or rerouted in the communication system dependent on the respective legitimacy result communicated from the application means. By aborting call setups or, respectively incoming calls, unallowed connections are prevented and misconnections (for example data connection to a computer) are avoided. Given possible reroutings, the call setup can be continued with modified or with the same call numbers.

According to an advantageous development of the inventive method, the legitimacy of the indicated traffic relationship is checked in the application means using stored origin/destination call number combinations and of the reported destination and origin call number combinations of a call. A legitimacy result is communicated to the communication system dependent on the coincidence of the call number combinations, whereby the respective call is rejected given inadmissible traffic relationships as a result of the communicated legitimacy result and the call setup of the respective call is continued given admissible traffic relationships as a result of the legitimacy result. The check of traffic relationships is provided, for example, for checking data connections wherein only communication terminals to which data transmission means are connected are to be switched.

According to another advantageous development of the inventive method, the legitimacy of the call number is checked in the application means using stored call numbers and of the reported destination call number of a call and an inadmissible destination call number that is found is converted into an admissible destination call number. As legitimacy result, the converted destination call number is communicated to the inhibit dial evaluation routine in the communication system and the call setup of the respective call is continued with the converted destination call-up number. This conversion is provided, for example, for the conversion of call numbers that are no longer valid or for the conversion of call numbers with whose assistance an incoming call is to be routed to a destination communication terminal equipment via a further, for example, a more cost-beneficial communication network.

According to another advantageous development of the inventive method, the legitimacy of the inhibit dial evaluation routine is checked in the application means using stored call numbers and of the reported destination call number of a call. An admissible dial evaluation routine of the communication system is identified after the determination of an inhibit dial evaluation routine that is not permitted for the processing of the destination call number and the destination call number is communicated to the identified dial evaluation routine onto which the call is rerouted and in which the call setup of the call is continued.

According to a development of the inventive method, the legitimacy check is initiated using an inhibit dial evaluation routine message that is formed in the inhibit dial evaluation routine and that is communicated to the application means. The check result is formed by an administration and maintenance application instruction formed in the application means and communicated to the communication system.

Further advantageous developments of the inventive method, particularly the structure of a dial evaluation routine message, of an administration and maintenance application instruction and of an order request or, respectively, order acknowledgment and the fashioning of an application means for the implementation of the inventive method are as follows.

The inhibit dial evaluation routing message comprises at least an identification information indicating the type of inhibit dial evaluation routine message, a switching information indicating the call number to be evaluated in an inhibit dial evaluation routine, a module information indicating the initialization of the inhibit dial evaluation routine message, a call number identifying the calling and the called communication terminal, as well as a group information indicating the reporting dial evaluation routine.

An administration and maintenance application instruction comprises an identification information indicating the type of administration and maintenance application instruction, a switching information indicating the switching-oriented action, a reference information indicating the allocation of the administration and maintenance application instruction and, insofar as identified, a call number to be evaluated anew in the communication system or a call number to which the call is to be rerouted, as well as a dial evaluation information indicating another dial evaluation routine.

An inhibit dial evaluation routine is established or, respectively, deactivated by an order request formed in the application means and communicated to the communication system. The establishment or, respectively deactivation is acknowledged by an order acknowledgment formed in the communication system and communicated to the application means. The call numbers or, respectively, call number combinations to be checked are stored as a result of the order request in a memory allocated to the inhibit dial evaluation routine.

The order request as well as the order acknowledgment comprises an identification information, an order information effecting the establishment or, respectively, deactivation in the communication system or an order acknowledgment information confirming the establishment or, respectively, deactivation, a reference information, a performance feature information indicating the performance feature to be influenced, a dial evaluation information indicating the respective dial evaluation routine, and, given establishment of an inhibit dial evaluation routine, a number information indicating the plurality of numbers to be utilized for the evaluation and an identifier point information indicating the identifier point allocated to a numerical combination.

The present invention is also an application device for the legitimacy check of call numbers or, respectively, call number combinations of calls incoming at a communication system. A microprocessor system monitors the application device and executes a call number evaluation routine that is realized in program-oriented terms and stored in a memory. This is performed for a legitimacy check of destination call numbers communicated in an inhibit dial evaluation routine message and, insofar as identified, for converting inadmissible destination call numbers into admissible call numbers as well as for forming an administration and maintenance application instruction dependent on the legitimacy check or, respectively, on the call number conversion. This is also performed for a legitimacy check of call number combinations communication in an inhibit dial evaluation routine message and for forming an administration and maintenance application instruction dependent on the legitimacy check.

The application device is realized by a personal computer in whose memory are stored the call numbers to be checked, to be converted as well as provided for routing over further communication networks as well as the call number evaluation routine realized in program-oriented terms.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

FIGS. 2A–2C depict the structure of an inhibit dial evaluation routine message, of an administration and maintenance application instruction and of an order request or, respectively, order acknowledgment; and FIG. 3 depicts the functioning of a call number evaluation routine shown in a flowchart.

DESCRIPTION OF THE PREFERRED EMBODIMENTS

Figure 1:
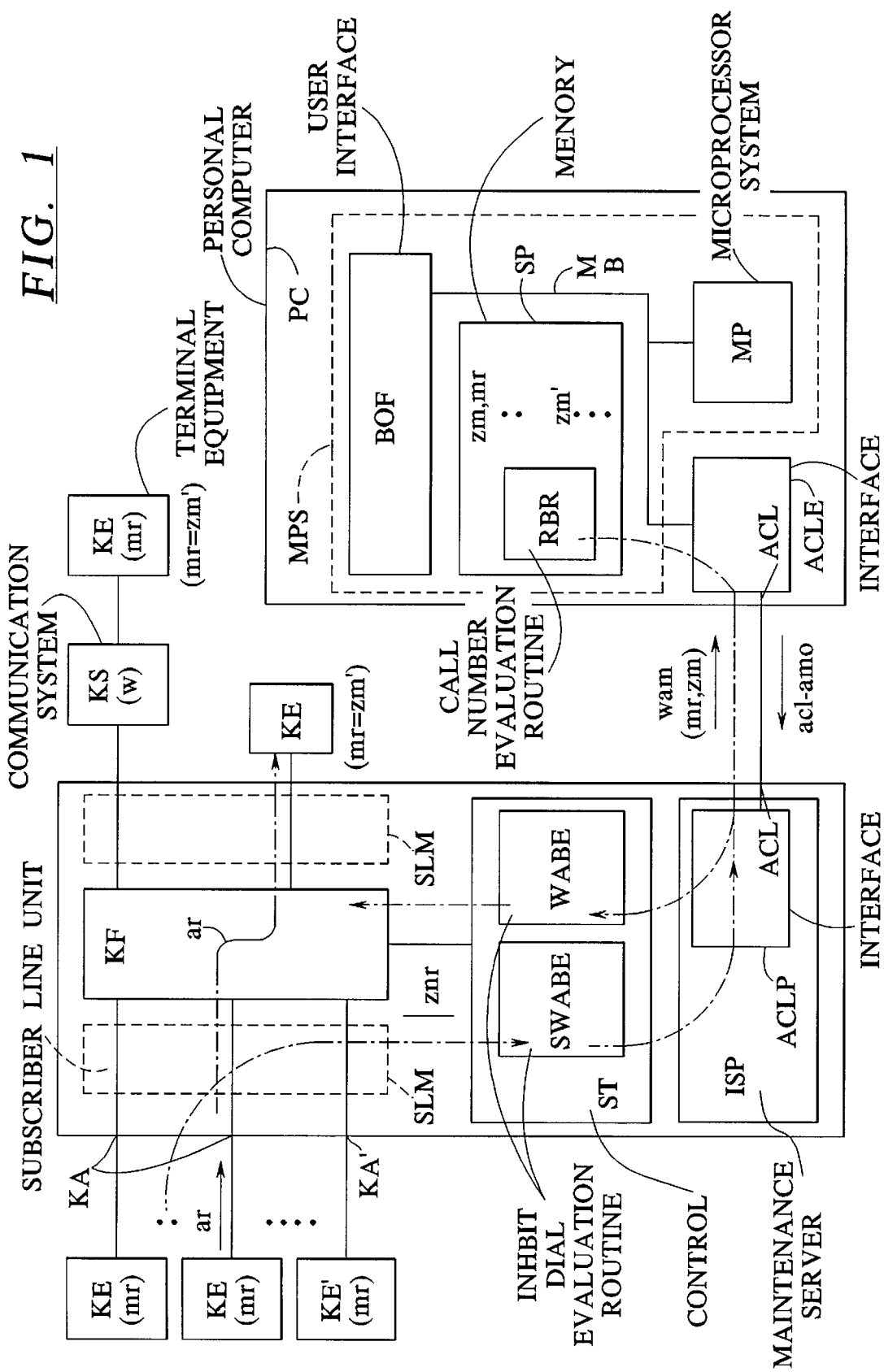
FIG. 1 is a communication system with a connected application means.

FIG. 1 shows a communication system KS (particularly a private communication system) with an application interface (referred to below as ACL interface) to which an application means PC (referred to below as personal computer PC) realized by a personal computer is connected via an identically realized ACL interface ACL. The ACL interface ACL in the communication system KS is realized by an ACL program structure ACL implemented in an integrated administration and maintenance server ISP. In the personal computer PC, the ACL interface ACL is physically and procedurally realized in an ACL unit ACLE. The abbreviation ACL stands for applications connectivity link and means that a communication exchange via the ACL interface ACL for an application-dependent connection control in the communication system KS is controlled via a connection, i.e. a link.

The communication system KS comprises a control means ST for the switching-oriented control that is connected to the switching network and to the integrated administration and maintenance server ISP. In addition to the switching-oriented and administration and maintenance program structure (not shown), an inhibit dial evaluation routine SWABE is provided in the control means ST. The inhibit dial evaluation routine SWABE is established by the administration and maintenance instructions amo via the administration and maintenance server ISP. Advantageously, one of the dial evaluation routines WABE provided for the dial evaluation is configured as inhibit dial evaluation routine SWABE on the basis of appropriate administration and maintenance instructions. The inhibit dial evaluation routine SWABE have communication terminals KA of the communication system KS allocated to them in turn on the basis of appropriate administration and maintenance instructions, whereby communication terminal equipment KE can be connected to the allocated communication terminals KA. These and further communication terminals KA, KA' are connected to the switching network KF of the communication system KS via subscriber line units SLM (indicated with broken lines). Let it be assured for the exemplary embodiment that a call number rnr, rnr' is allocated to a communication terminal KA, KA' or, respectively, to the communication terminal equipment KE, KE' connected thereto.

From the subscriber line units SLM of the communication system KS, the call numbers or, respectively, destination call numbers zrn selected during the framework of a call setup for the allocated communication terminals KA are communicated to the inhibit dial evaluation routine SWABE in the control unit ST. Therein, the communicated call numbers zrn together with their own call numbers rnr—i.e. the call numbers rnr of the calling communication terminal equipment KE—are acquired and call numbers zrn or, respectively, call number combinations rnr, zrn that cannot be evaluated are communicated via the ACL interface ACL to the personal computer PC, whereby a call number combination rnr, zrn represents an originating call number rnr representing the calling communication terminal equipment KE and the destination call numbers zrn selected by the respective communication terminal equipment KE. Call numbers zrn that cannot be evaluated are represented, for example, by a prefix call number 12 of the telecommunication service es ISDN or the national or regional call number. These call numbers zrn or the call number combinations rnr, zrn that cannot be evaluated are inserted into an inhibit dial evaluation routine message wam and are communicated to the personal computer PC. After receiving an administration and maintenance application instruction (ACL-amo) representing the legitimacy result in the communication system KS, the call setup initiated by the respective communication terminal equipment KE and held until the reception of the administration and maintenance application instruction acl-amo is rerouted to a different to a different dial evaluation routine WABE, carried on with a modified destination call number zrn' or clear down, i.e. ended.

The personal computer PC comprises a microprocessor system MPS in which a microprocessor MP, a memory SP, an ACL unit ACLE and a user surface BOF are connected to a microprocessor bus MB. The user surface BOF is formed in a way standard for PCs by a picture screen means and a keyboard—not shown. A call number evaluation routine RBR is stored in the memory SP which comprises a data and program area. Based on the above-explained communication system KS, the inventive legitimacy check is realized with the assistance of the dial evaluation routine RBR. Further, destination and originating call numbers zrn, rnr or, respectively, call number combinations or rerouting call numbers rzn' provided for a legitimacy check are stored in the memory SP.

It is assumed, for example, for the exemplary embodiment that a data communication terminal equipment KE connected to the communication terminal KA with the call number rnr=4490 is not authorized to dial an ISDN call number 12 0045 6 77985 but is authorized to dial the ISDN call number 12 0048 7 667. With the assistance of the inhibit dial evaluation routine message wam, administration and maintenance application instructions acl-amo as well as order request or, respectively, order confirmation aa, aq shown in FIGS. 2A–2C, the inventive inhibit dial evaluation routine SWABE is activated with reference to the preceding, exemplary assumptions, and the information exchange is effected between the communication system KS and the application means PC. It is thereby assumed that the inhibit dial evaluation routine SWABE in the communication system KS is established such by administration and maintenance instructions that it can be activated by an order request aa and the communication terminals KA or, respectively, their allocated call numbers rnr to be evaluated are allocated to this inhibit dial evaluation routine SWABE, i.e. call numbers zrn of calls r incoming at the allocated communication terminals KA are switched to the inhibit dial evaluation routine SWABE.

Figures 2C, 3:
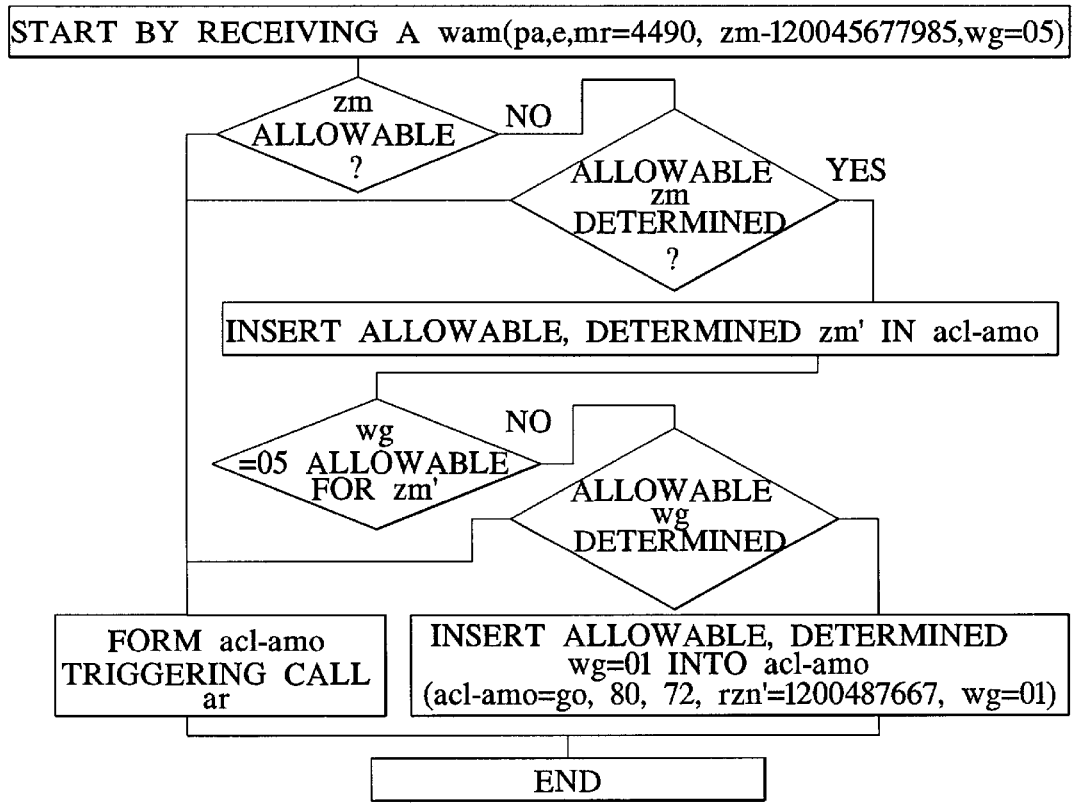

The activation or, respectively, the deactivation of an inhibit dial evaluation routine SWABE is implemented by an order request aa or, respectively, order acknowledgment aq illustrated in FIG. 2C. An order request aa or, respectively, order acknowledgment aq is formed by an identification information skz (co), by an order information ac (10, 90) effecting the activation or, respectively, deactivation in the communication system ks or, respectively, by an order acknowledge information ac (10, 90) acknowledging the activation or, respectively, deactivation, by a reference information ref (for example, 55), by a performance feature information Im (for example 96 for establishing and inhibit dial evaluation routine SWABE) that indicates the performance feature to be influenced and by a dial evaluation information wg (for example, dial evaluation routine 05) that indicates the respective dial evaluation routine WABE, whereby the information referring to the exemplary embodiment are indicated placed in parenthesis. A number information zi indicating the plurality of numbers to be utilized for the evaluation and an identifier point information kzi indicating the identifier point allocated to a numerical combination is not provided in the exemplary embodiment. The order acknowledgment aq communicated from the communication system KS to the application means PC is identically constructed, whereby the identification information skz is modified into the value (ca) given a positive acknowledgment.

When the ISDN call number 12 0045 6 77985 is selected in the data communication terminal equipment KE—call number 4490—, then this is switched to the activated inhibit dial evaluation routine SWABE and is recognized as being non-evaluatable therein since the inhibit dial evaluation routine SWABE according to the exemplary embodiment is not fashioned for the evaluation of ISDN call numbers. The originating and destination call numbers rnr, zrn acquired in the inhibit dial evaluation routine SWABE are inserted into an inhibit dial evaluation routine message wam and are communicated to the application means PC via the ACL interface ACL. An inhibit dial evaluation routine message wam shown in FIG. 2A is formed by an identification information skz (pa) indicating the type of inhibit dial evaluation routine message wam, by a switching information vzt (Y) indicating call numbers rnr, znr to be evaluated in the inhibit dial evaluation routine SWABE, by a module information poi (E) indicating the initialization of the inhibit dial evaluation routine message wam, by the call number rnr, zrn (4490, 120045677985) identifying the calling and called communication terminal KA, as well as by a dial evaluation information wg (05) indicating the reporting dial evaluation routine SWABE, whereby the information relating to the exemplary embodiment are recited in parentheses.

In the application means PC, the legitimacy check of the communicated call numbers rnr, zrn shows that both the destination call number zrn as well as the dial evaluation routine WABE employed are not permissible. It is assumed in the exemplary embodiment that the permissible ISDN call number 12 0048 7667 is stored in the memory of the application means PC and is identified by the legitimacy check. This means a conversion of the communicated destination call number zrn into the identified destination call number zrn'. The first dial evaluation routine WABE has been identified in the legitimacy check for the evaluation of ISDN call numbers. The identified call numbers zrn' and information about the identified dial evaluation routines WABE are inserted into an administration and maintenance application instructions acl-amo shown in FIG. 2B.

An administration and maintenance application instruction acl-amo comprises an identification information skz (go) indicating the type of administration and maintenance application instruction acl-amo, a switching information vtz (80) indicating the switching-oriented action, a reference information ref—for example, the number (55) indicating the allocation of the administration and maintenance application instruction acl-amo, a call number rnz' (1200487667) to be evaluated anew in the communication system KS and to which the call ar is to be rerouted, as well as a dial evaluation information wg (01) indicating another dial evaluation routine WABE. After reception of the administration and maintenance application instruction acl-amo in the communication system KS, the call ar therein is rerouted to the first dial evaluation routine WABE and the converted destination call number zrn' that is co-transmitted is evaluated by it. After this evaluation, the call setup for the connection previously held in the communication system KS is successfully continued or unsuccessfully aborted. Given a successful legitimacy check, the connection is set up to the communication terminal equipment KE (z) whose call numbers rnr corresponds to the converted destination call number znr'. Alternatively, the call setup can also be setup via another communication system KS (w) (indicated with broken lines in FIG. 1) to a communication terminal equipment KE (z) whose call number rnr corresponds to the converted destination call number zrn'.

In a self-explanatory flow chart, FIG. 3 shows the legitimacy check in the application means PC realized in the call number evaluation routine RBR for the assumed exemplary embodiment. The call number evaluation routine RBR is started by an inhibit dial evaluation routine message warn communicated from an activated inhibit dial evaluation routine SWABE. The call numbers zrn or, respectively, call number combinations rnr, znr stored in the memory SP for the legitimacy check as well as the destination call number combinations zrn, zrn' provided for a call number conversion are read by linked memory addresses—not shown—by a call number evaluation routine RBR and are utilized for the legitimacy check.

The invention is not limited to the particular details of the method and apparatus depicted and other modifications and applications are contemplated. Certain other changes may be made in the above described apparatus without departing from the true spirit and scope of the invention herein involved. It is intended, therefore, that the subject matter in the above depiction shall be interpretend as illustrative and not in a limiting sense.

Patent claims:

1. A method for legitimacy checking of call numbers or, respectively, call number combinations of calls incoming to a communication system, the communication system being connected via an application interface to an application device comprising the steps of:

allocating communication terminals provided in the communication system for a legitimacy check to at least one inhibit dial evaluation routine;

acquiring call numbers communicated to the inhibit dial evaluation routine from a communication terminal within the framework of a call as well as a call number of the communication terminal, and reporting call numbers or, respectively, call number combinations that cannot be evaluated to the application device via the application interface; and holding the calls in the communication system until the communicated call numbers or, respectively, call number combinations are checked regarding legitimacy thereof in the application device and communicating a legitimacy result from the application device to the communication system.

2. The method according to claim 1, wherein a call is one of allowed, aborted or rerouted in the communication system dependent on a legitimacy result communicated from the application device.

3. The method according to claim 1, wherein legitimacy of an indicated traffic relationship is checked in the application device using stored originating/destination call number combinations and using reported destination and originating call number combinations of a respective call and, wherein dependent on coincidence of the call number combinations, a legitimacy result is communicated to the communication system, whereby, given inadmissible traffic relationships based on the communicated legitimacy result, the respective call is rejected and, given permitted traffic relationships based on the legitimacy result, call setup of the respective call is continued.

4. The method according to claim 1, wherein legitimacy of a destination call number is checked in the application device using stored call numbers and using reported destination call number of a respective call; wherein identified, impermissible destination call number is converted into an admissible destination call number; and wherein, as a legitimacy result, the converted destination call number is communicated to the inhibit dial evaluation routine in the communication system and the call setup of the respective call is continued with the converted destination call number.

5. The method according to claim 1, wherein legitimacy of the inhibit dial evaluation routine is checked in the application device using stored call numbers and using reported destination call numbers of a respective call; wherein after finding an inhibit dial evaluation routine not permitted for processing of the destination call number, a permissible dial evaluation routine of the communication system is identified and the destination call number is communicated to the identified, permitted dial evaluation routine the call being rerouted to the permitted dial evaluation routine and call setup of the respective call being continued therein.

6. The method according to claim 1, wherein the legitimacy check is initiated using an inhibit dial evaluation routine message formed in the inhibit dial evaluation routine and communicated to the application device, and wherein a legitimacy result is reported by an administration and maintenance application instruction that is formed in the application device and communicated to the communication system.

7. The method according to claim 6, wherein the inhibit dial evaluation routine message has at least:

identification information indicating a type of inhibit dial evaluation routine message;

switching information indicating a call number to be evaluated in an inhibit dial evaluation routine;

module information indicating initialization of the inhibit dial evaluation routine message;

a call number identifying calling and called communication terminals; and group information indicating a reporting dial evaluation routine.

8. The method according to claim 6, wherein the administration and maintenance application instruction has at least:

identification information indicating a type of administration and maintenance application instruction;

switching information indicating a switching-oriented action;

reference information indicating allocation of the administration and maintenance application instruction, and, insofar as identified;

one of a call number to be evaluated anew in the communication system or a call number to which a reported call is to be rerouted, as well as dial evaluation information indicating another dial evaluation routine.

9. The method according to claim 1, wherein an inhibit dial evaluation routine is established or, respectively, deactivated by an order request formed in the application device and communicated to the communication system; and wherein the establishment or, respectively deactivation is acknowledged by an order acknowledgment formed in the communication system and communicated to the application device, whereby call numbers or, respectively, call number combinations to be checked are stored as a result of the order request in a memory allocated to the inhibit dial evaluation routine.

10. The method according to claim 9, wherein the order request as well as the order acknowledgment has:

identification information;

one of order information effecting establishment or deactivation in the communication system and an order acknowledgment information confirming establishment or, respectively, deactivation;

reference information;

performance feature information indicating a performance feature to be influenced;

dial evaluation information indicating a dial evaluation routine; and given establishment of an inhibit dial evaluation routine, number information indicating a plurality of numbers to be utilized for evaluation and identifier point information indicating identifier point allocated to a numerical combination.

11. An application apparatus for legitimacy checking of call numbers or, respectively, call number combinations of calls incoming at a communication system, comprising:

a microprocessor system for monitoring the application apparatus;

a memory coupled to the microprocessor system;

a call number evaluation routine, executed by the application apparatus, the call number evaluation routing being realized in program-oriented terms and stored in the memory;

the call number evaluation routine being used for legitimacy checking of destination call numbers communicated in an inhibit dial evaluation routine message and, insofar as identified, for converting inadmissible destination call numbers into admissible call numbers as well as for forming an administration and maintenance application instruction dependent on the legitimacy check or, respectively, on the call number conversion, and for legitimacy checking call number combinations communication in an inhibit dial evaluation routine message and for forming an administration and maintenance application instruction dependent on the legitimacy check.

12. The application apparatus according to claim 11, wherein the application device is a personal computer in whose memory are stored call numbers to be checked, to be converted as well as provided for routing over further communication networks as well as the call number evaluation routine realized in program-oriented terms.

13. A method for legitimacy checking of call numbers or, respectively, call number combinations of calls incoming to a communication system, the communication system being connected via an application interface to an application device comprising the steps of:

allocating communication terminals provided in the communication system for a legitimacy check to at least one inhibit dial evaluation routine;

acquiring call numbers communicated to the inhibit dial evaluation routine from a communication terminal within the framework of a call as well as a call number of the communication terminal, and reporting call numbers or, respectively, call number combinations that cannot be evaluated to the application device via the application interface; and holding the calls in the communication system until the communicated call numbers or, respectively, call number combinations are checked regarding legitimacy thereof in the application device and communicating a legitimacy result from the application device to the communication system, the legitimacy check being initiated using an inhibit dial evaluation routine message formed in the inhibit dial evaluation routine and communicated to the application device, a legitimacy result being reported by an administration and maintenance application instruction that is formed in the application device and communicated to the communication system;

the inhibit dial evaluation routine message having at least identification information indicating a type of inhibit dial evaluation routine message, switching information indicating a call number to be evaluated in an inhibit dial evaluation routine, module information indicating initialization of the inhibit dial evaluation routine message, a call number identifying calling and called communication terminals, and group information indicating a reporting dial evaluation routine; and the administration and maintenance application instruction having at least, identification information indicating a type of administration and maintenance application instruction, switching information indicating a switching-oriented action, reference information indicating allocation of the administration and maintenance application instruction, and, insofar as identified, one of a call number to be evaluated anew in the communication system or a call number to which a reported call is to be rerouted, as well as dial evaluation information indicating another dial evaluation routine.

14. The method according to claim 13, wherein a call is one of allowed, aborted or rerouted in the communication system dependent on a legitimacy result communicated from the application device.

15. The method according to claim 13, wherein an inhibit dial evaluation routine is established or, respectively, deactivated by an order request formed in the application device and communicated to the communication system; and wherein the establishment or, respectively deactivation is acknowledged by an order acknowledgment formed in the communication system and communicated to the application device, whereby call numbers or, respectively, call number combinations to be checked are stored as a result of the order request in a memory allocated to the inhibit dial evaluation routine.

16. The method according to claim 15, wherein the order request as well as the order acknowledgment has:

identification information;

one of order information effecting establishment or deactivation in the communication system and an order acknowledgment information confirming establishment or, respectively, deactivation;

reference information;

performance feature information indicating a performance feature to be influenced;

dial evaluation information indicating a dial evaluation routine; and given establishment of an inhibit dial evaluation routine, number information indicating a plurality of numbers to be utilized for evaluation and identifier point information indicating identifier point allocated to a numerical combination.

* * * * *